United States Patent
Gayer et al.

(10) Patent No.: US 7,077,431 B2
(45) Date of Patent: Jul. 18, 2006

(54) FLEXIBLE GAP COVERING BETWEEN AN ADJUSTABLE STEERING COLUMN OF A MOTOR VEHICLE AND AN INSTRUMENT PANEL AND METHOD OF MAKING SAME

(75) Inventors: Bernd Gayer, Weissach (DE); Thomas Bruening, Hemmingen (DE); Martin Frank, Muehlacker (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 403 days.

(21) Appl. No.: 10/664,033

(22) Filed: Sep. 17, 2003

(65) Prior Publication Data

US 2004/0129098 A1    Jul. 8, 2004

(30) Foreign Application Priority Data

Sep. 17, 2002    (DE)    ................... 102 42 966

(51) Int. Cl.
*B62D 1/18*    (2006.01)
(52) U.S. Cl. ................... 280/775; 180/90; 296/70
(58) Field of Classification Search ............... 280/775, 280/779, 777, 780; 180/90; 74/492, 493; 296/70

See application file for complete search history.

(56) References Cited

U.S. PATENT DOCUMENTS

| | | | | |
|---|---|---|---|---|
| 3,172,683 | A | * | 3/1965 | D Antini ................... 280/750 |
| 3,797,601 | A | * | 3/1974 | Barenyi et al. ............... 180/78 |
| 3,815,437 | A | * | 6/1974 | Martin ........................ 74/492 |
| 4,899,612 | A | | 2/1990 | Bruhnke et al. ............. 74/493 |
| 5,813,288 | A | * | 9/1998 | Simonetti ..................... 74/492 |
| 2005/0001445 | A1 | * | 1/2005 | Ercolano et al. ........... 296/97.7 |

FOREIGN PATENT DOCUMENTS

| | | |
|---|---|---|
| DE | 37 28 457 | 1/1989 |
| DE | 195 25 181 | 1/1997 |
| DE | 20017192 U | 12/2000 |
| EP | 0 753 447 | 1/1997 |

OTHER PUBLICATIONS

European Search Report Dated Aug. 9, 2004.

* cited by examiner

*Primary Examiner*—Paul N. Dickson
*Assistant Examiner*—Toan C. To
(74) *Attorney, Agent, or Firm*—Crowell & Moring LLP

(57) ABSTRACT

A flexible gap covering between an adjustable steering column of a motor vehicle and an instrument panel, on one side, is fastened to the steering column covering and, on the other side, is fastened to the instrument panel. A flexible gap covering which permits a large adjusting range of the steering column, is easy to mount and has a corresponding appearance, has an upper covering and a lower covering. The upper covering is formed of two parts, which are arranged above one another and are fixedly connected with one another in a joint overlapping area. At least one tensioning element is applied to the overlapping area on the side facing away from the vehicle occupant compartment.

22 Claims, 5 Drawing Sheets

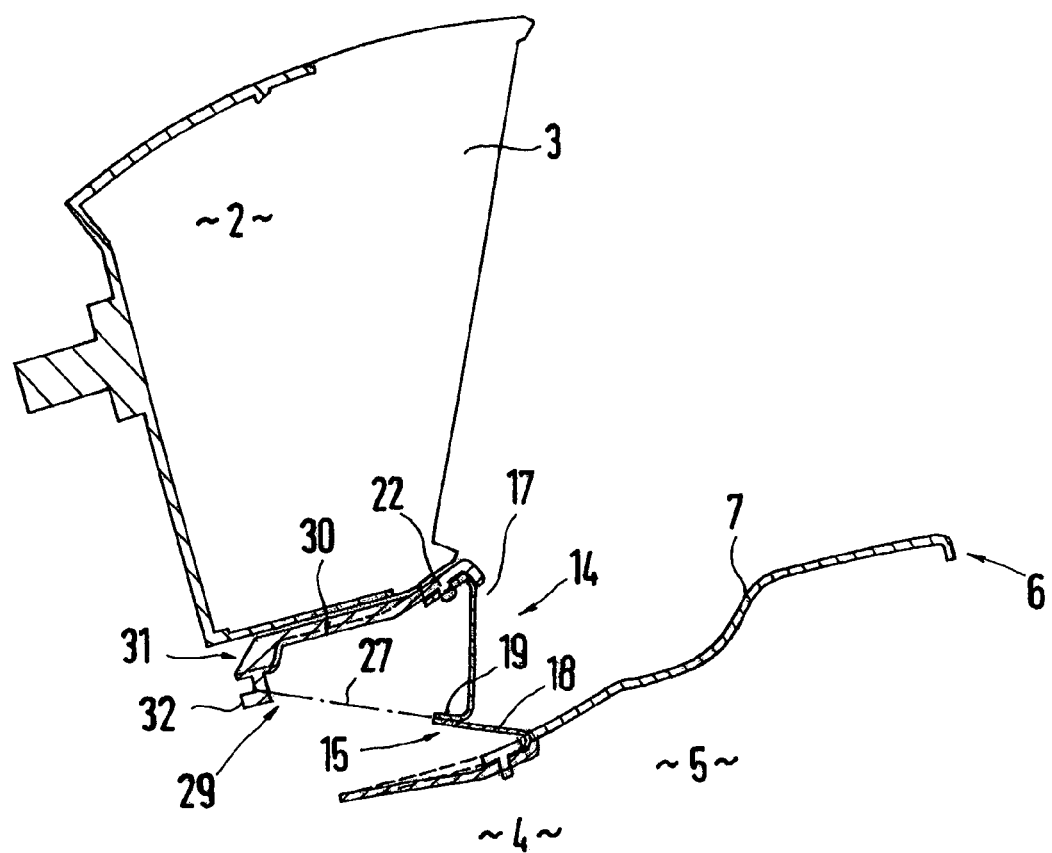
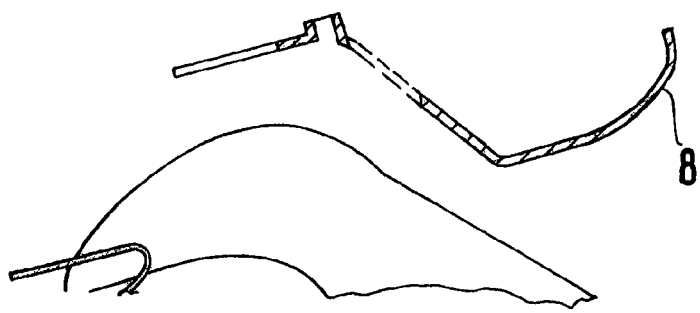
Fig. 5

FLEXIBLE GAP COVERING BETWEEN AN ADJUSTABLE STEERING COLUMN OF A MOTOR VEHICLE AND AN INSTRUMENT PANEL AND METHOD OF MAKING SAME

BACKGROUND AND SUMMARY OF THE INVENTION

This application claims the priority of German Application No. 102 42 966.9 filed Sep. 17, 2002, the disclosure of which is expressly incorporated by reference herein.

The invention relates to a flexible gap covering between an adjustable steering column of a motor vehicle and an instrument panel, the gap covering on one side, being fastened to a steering column covering and, on the other side, being fastened to the instrument panel.

From German Patent Document DE 195 25 181 A1, a flexible gap covering between a flexible steering column of a motor vehicle and an instrument panel is known, where the frame-type gap covering constructed in one piece, on one side, is fastened to the steering column covering and, on the other side, is fastened to the instrument panel. The mounting of this one-piece gap covering on the steering column covering and on the instrument panel is difficult and time-consuming because of the narrow space conditions in the gap area.

It is an object of the invention to further develop a flexible gap covering between an adjustable steering column of a motor vehicle and an instrument panel such that it permits a large adjusting range of the steering column, is easily mountable and, in addition, has an attractive appearance.

According to the invention, this object is achieved by providing a flexible gap covering assembly between an adjustable steering column of a motor vehicle and an instrument panel, the gap covering assembly, on one side, being fastened to a steering column covering and, on the other side, being fastened to the instrument panel, wherein the flexible gap covering comprises an upper covering and a lower covering, wherein the upper covering comprises two parts which are arranged above one another and are fixedly connected with one another in a joint overlapping area, and wherein at least one tensioning element is applied to the joint overlapping area on a side facing away from a vehicle occupant compartment when installed in a motor vehicle.

Further advantageous features of preferred embodiments of the invention are described herein and in the claims.

The important advantages achieved by means of preferred embodiments of the invention are that the flexible gap covering formed by an upper covering and a lower covering can be mounted in a rapid and simple fashion. As a result of the two-part construction of the upper covering and the arrangement of at least one tensioning element, the two parts of the upper covering are tensioned in all positions of the steering column, so that the parts take up a visually attractive low-wrinkle tensioned position. Both coverings of the flexible gap covering assembly may be preassembled with one end either on the instrument panel or the steering column covering, whereas the other end can be fastened by way of a releasable fastening according to certain preferred embodiments of the invention. Furthermore, by means of the flexible gap covering assembly, a muffling effect is achieved and no dirt can penetrate through the recess according to certain preferred embodiments of the invention. The flexible gap covering assembly permits large adjusting movements of the steering column and is held in a taut low-wrinkle tensioned position by means of the at least one tensioning element according to certain preferred embodiments of the invention.

Other objects, advantages and novel features of the present invention will become apparent from the following detailed description of the invention when considered in conjunction with the accompanying drawings.

BRIEF DESCRIPTION OF THE DRAWINGS

FIG. 5 is a sectional view similar to FIG. 4 showing a second embodiment for fastening the tensioning element;

DETAILED DESCRIPTION OF THE DRAWINGS

Figure 1:
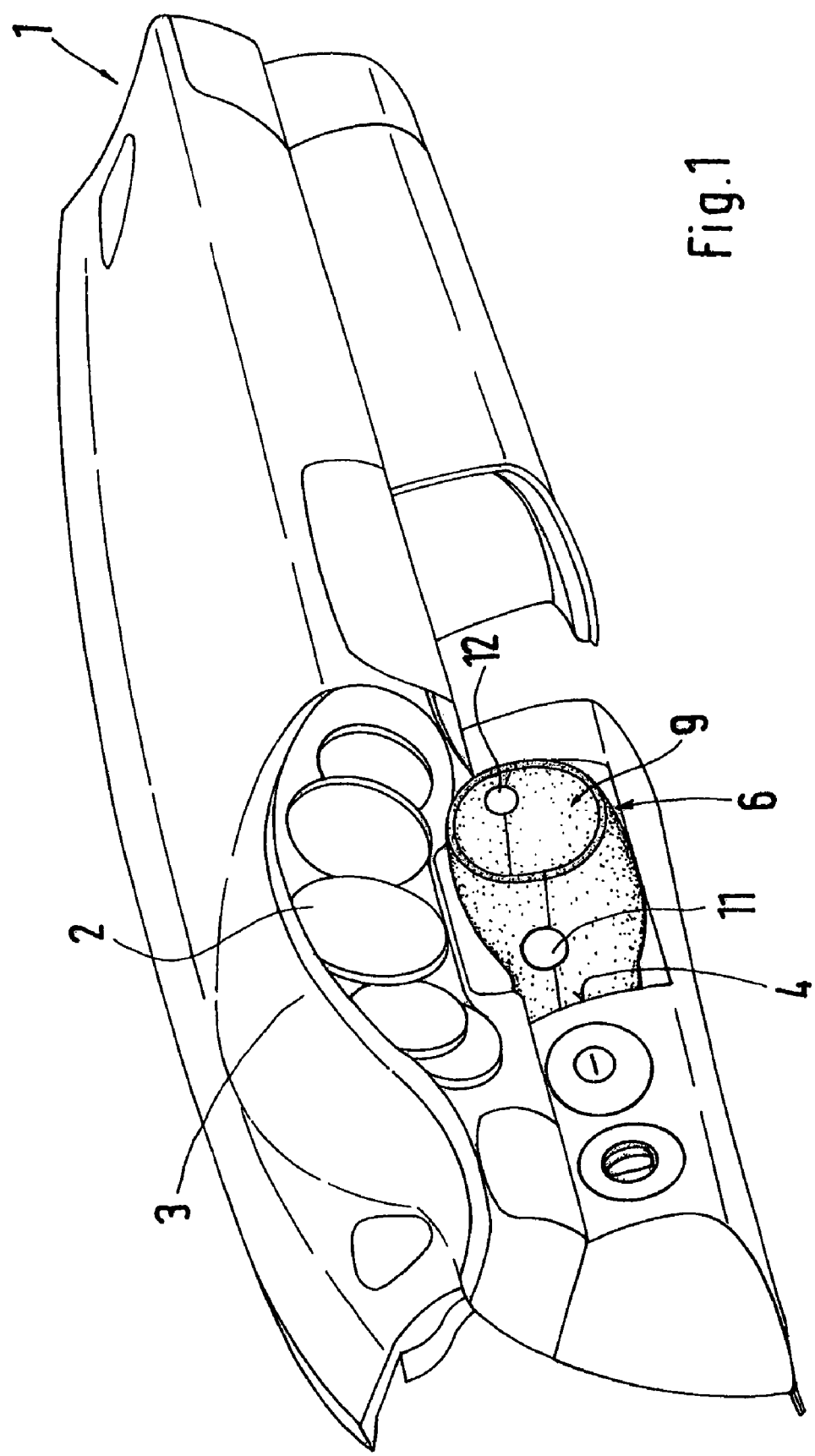
FIG. 1 is a view diagonally from the front of the instrument panel of a vehicle having a recess for the guiding-through of a steering column as well as a steering column covering, constructed according to a preferred embodiment of the present invention.
Figure 2:
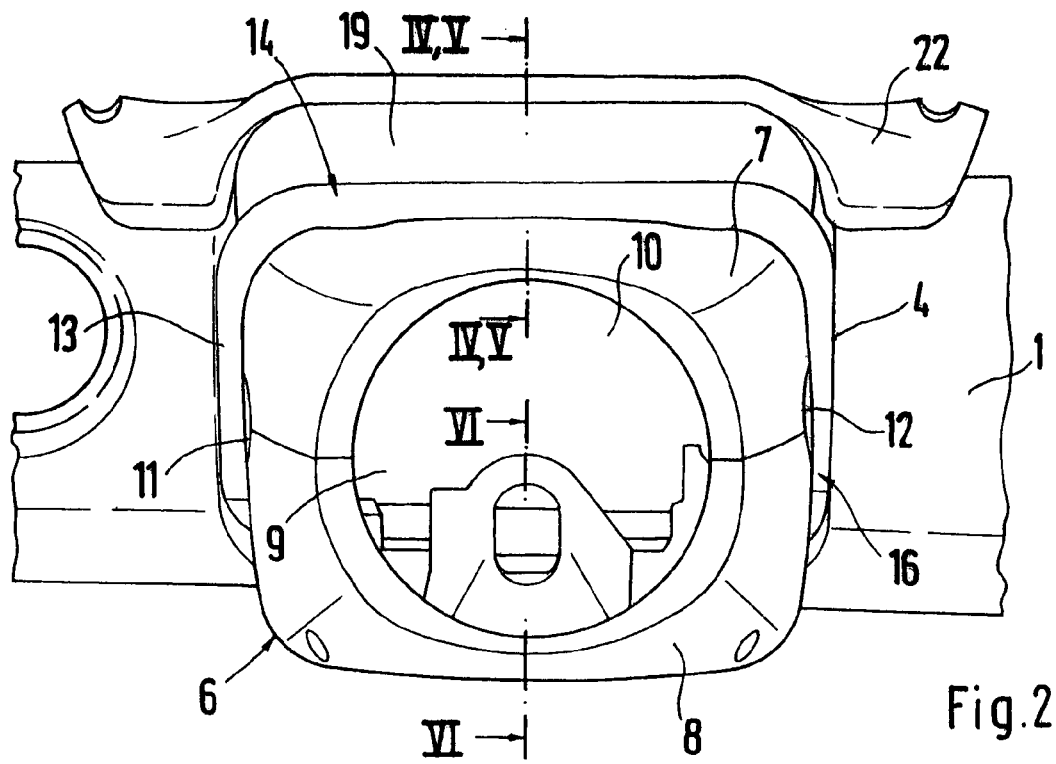
FIG. 2 is a partial enlarged view from the front onto the instrument panel, the steering column covering and a flexible gap covering assembly between the steering column covering and the instrument panel to the arrangement of FIG. 1.
Figure 3:
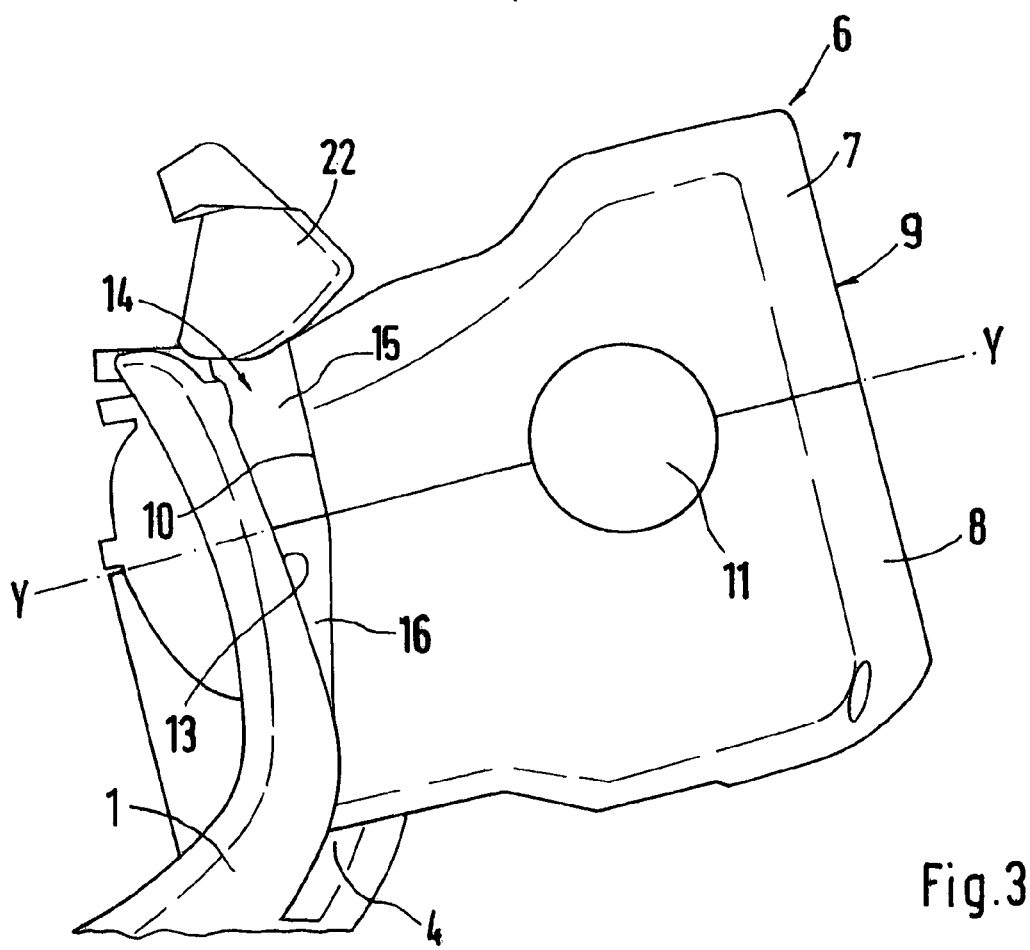
FIG. 3 is a view laterally from the outside onto the instrument panel, the steering column covering and the gap covering assembly of the arrangement of FIG. 1.
Figure 4:
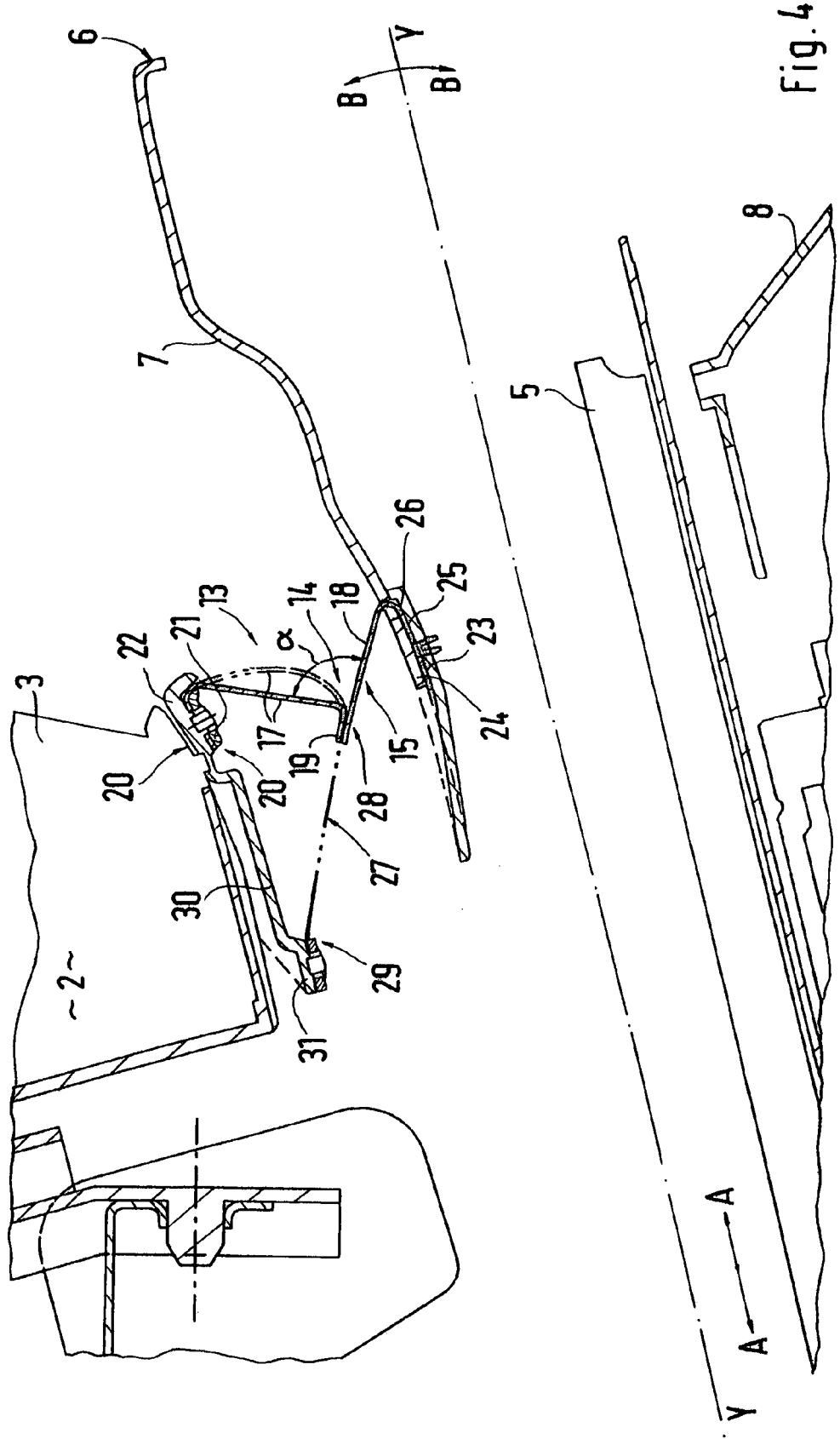
FIG. 4 is a sectional view taken along Line III—III of FIG. 2.

FIG. 1 shows a partial area of an instrument panel 1, in which case a recess 4 is provided in the driver's range below a scoop 3 accommodating instruments 2, through which recess 4 a steering column 5 is guided which, on its upper end, is connected with a steering wheel not shown in detail. The steering column 5 penetrates the recess 4 in the instrument panel 1 and can be adjusted in the axial direction (arrows A) as well is in its height (arrows B) (FIG. 4). When the steering column is adjusted in its height, the adjustable area of the steering column 5 with the steering wheel swivels about an axis of rotation which is not shown and is situated close to the recess 4.

Adjacent to the steering wheel, the steering column 5 is provided with a steering column covering 6 toward the vehicle occupant compartment, which steering column covering 6 is composed of an upper shell 7 and a lower shell 8. The upper shell 7 and the lower shell 8 are adjoined along a steering column center plane Y—Y and are detachably connected with one another as well as with the interior steering column 5. In the front and in the rear, the steering column covering 6 has openings 9, 10 for the passing-through of the steering column 5. Recesses 11, 12 for a turn signal lever or a wiper lever are provided on the lateral surfaces of the steering column covering 6. During an adjusting movement of the steering column 5, the steering column covering 6 moves along with the adjustable steering column 4, and a surrounding gap 13 will change between the steering column covering 6 and the recess 4 of the instrument panel 1.

For covering the changeable gap 13, a flexible gap covering assembly 14 is provided which comprises a bendable foldable material, such as leather, imitation leather, or the like.

The flexible gap covering assembly 14 comprises an upper covering 15 and a lower covering 16, the separation between the two coverings 15, 16 being situated in the area of the steering column center plane Y—Y. The upper covering 15 comprises two parts 17, 18 made of a bendable foldable material, which—viewed in the vertical direction—are arranged above one another, and are sewn together, glued together or otherwise connected with one another in a common overlapping area 19. At its edge 20 situated away from the overlapping area 19, the upper part 17 of the covering 15 is held in position by means of a holding clamp 21 on a bridge 22 of the instrument panel 1. In this case, a bent edge area of the upper part 17 is clamped between the underside of the bridge 22 and the holding clamp 21, the holding clamp 21 being fastenable on the bridge 22 by means of welding, snapping, or the like. The bridge 22 is detachably connected with the instrument panel 1 situated underneath. At its edge 23 situated away from the overlapping area 19, the lower part 18 of the covering 15 is fastened by means of an approximately U-shaped tensioning frame 24 to the exterior side of the upper shell 7 of the steering column covering 5. Here also, a bent edge area of the lower part 18 is clamped between the exterior side of the upper shell 7 and the tensioning frame 24. The tensioning frame can be fastened to the upper shell 7 by means of snapping, welding or the like.

According to FIG. 4, the upper shell 7 has a set-back depression 26 in the fastening area for the upper covering 15. The upper covering 15 is acted upon by at least one tensioning element 27. One end 28 of the tensioning element 27 is connected to the joint overlapping area 19 of both parts 17, 18, whereas the other end 29 of the tensioning element 27 is detachably connected with the free end 31 of a molded-on holding arm 30 of the bridge 22. Preferably, two mutually spaced holding arms 30 are provided on the bridge 22 viewed in the transverse direction, one tensioning element 27 respectively being fastenable to the holding arms 30. A downward-projecting hook 32 of each holding arm 30 is used for fastening the end 29 of the tensioning element 27. The end 29 of the tensioning element 27 has an opening which permits a hooking-in of the tensioning element 27 on the hook 32 of the holding arm 30 (FIG. 5). In the embodiment shown, the tensioning element (27) is formed by a flexible rubber band.

When the steering column 5 is swivelled up and has not moved out, the two parts 17, 18 of the upper covering 15 extend in sections directly above one another and are tensioned by the tensioning element 27. When the steering column 5 is moved downward or toward the driver, the two parts 17, 18 of the upper covering 15 extend at an angle α with respect to one another, in which case both parts 17, 18 of the upper covering 15 are tensioned by the stretched tensioning element 27 and take up an approximately prolate position (see FIG. 4). However, according to FIG. 4, the part 17 of the upper covering may also have a slightly curved shaping (shown by a dash-dotted line).

Figure 6:
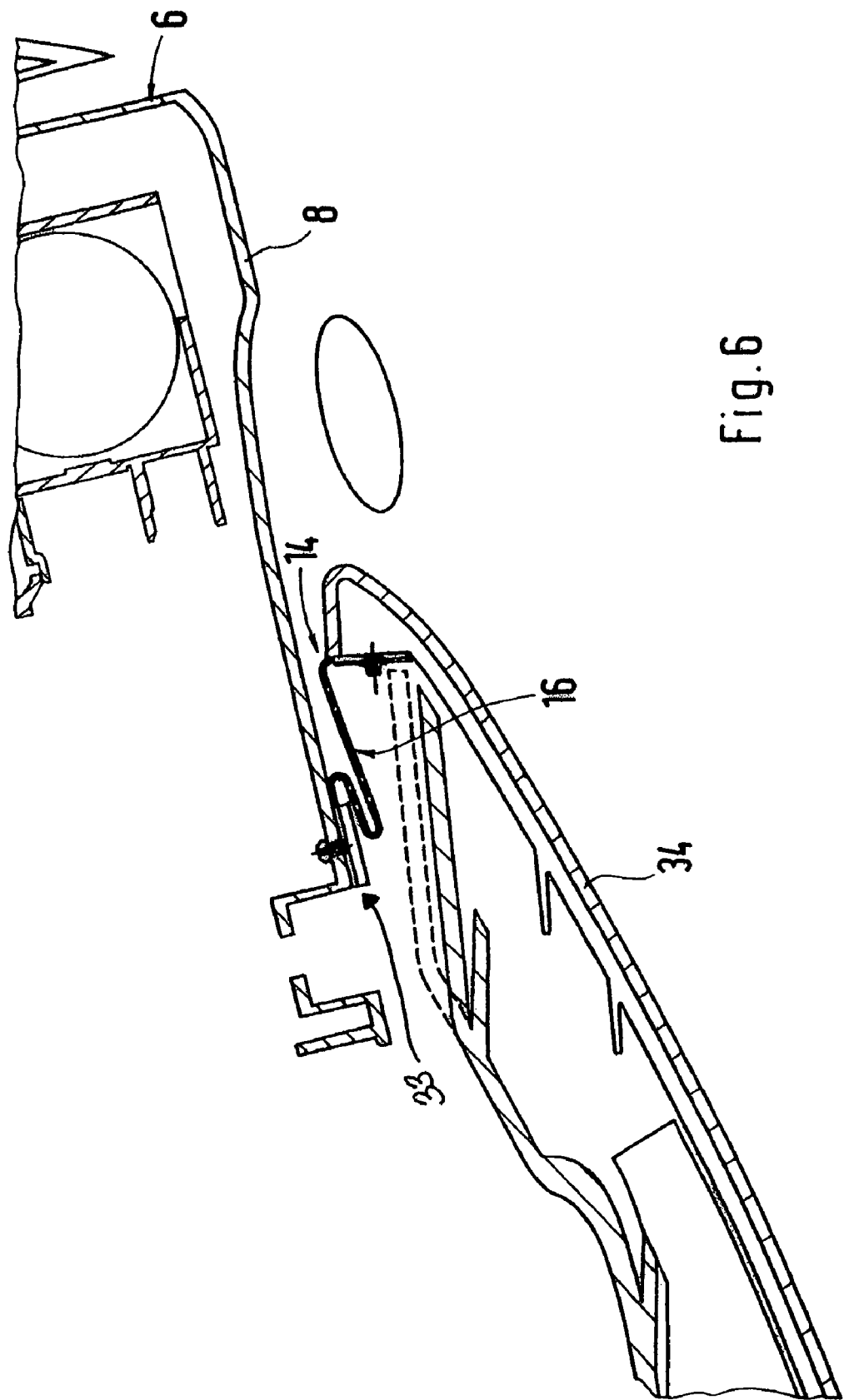
FIG. 6 is a sectional view taken along Line VI—VI of FIG. 2.

The one-piece lower covering 16 is, on the one side, tensioned by means of at least one inserted tensioning frame 33 against the exterior side of the lower shell 8 of the steering column covering 6 and is fastened to it by means of gluing, snapping, welding or the like. The other edge area of the lower covering 16 is locally held in position in a similar manner on the instrument panel bottom part 34 (see FIG. 6).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Flexible gap covering assembly disposable in use between an adjustable steering column of a motor vehicle and an instrument panel, the gap covering assembly, on one side, being fastened to a steering column covering and, on the other side, being fastened to the instrument panel,
   wherein the flexible gap covering assembly comprises an upper covering and a lower covering,
   wherein the upper covering comprises two parts which are arranged above one another and are fixedly connected with one another in a joint overlapping area, and
   wherein at least one tensioning element is applied to the joint overlapping area on a side facing away from a vehicle occupant compartment when installed in a motor vehicle.

2. Flexible gap covering assembly according to claim 1, wherein the upper covering is fastened to a transversely extending bridge of the instrument panel and to an upper shell of the steering column covering.

3. Flexible gap covering assembly according to claim 1, wherein the lower covering is held in position on a lower shell of the steering column covering and on an instrument panel bottom part.

4. Flexible gap covering assembly according to claim 1, wherein the two parts of the upper covering are mutually sewn together and/or glued together in the joint overlapping area.

5. Flexible gap covering assembly according to claim 1, wherein one end of the tensioning element is connected to the joint overlapping area of the upper covering, and
   wherein the other end of the tensioning element is detachably fastened to a free end of a holding arm extending at a distance from the fastening area of the upper covering.

6. Flexible gap covering assembly according to claim 2, wherein one end of the tensioning element is connected to the joint overlapping area of the upper covering, and
   wherein the other end of the tensioning element is detachably fastened to a free end of a holding arm extending at a distance from the fastening area of the upper covering.

7. Flexible gap covering assembly according to claim 4, wherein one end of the tensioning element is connected to the joint overlapping area of the upper covering, and
   wherein the other end of the tensioning element is detachably fastened to a free end of a holding arm extending at a distance from the fastening area of the upper covering.

8. Flexible gap covering assembly according to claim 1, wherein the at least one tensioning element is formed by a flexible rubber band.

9. Flexible gap covering assembly according to claim 2, wherein the at least one tensioning element is formed by a flexible rubber band.

10. Flexible gap covering assembly according to claim 3, wherein the at least one tensioning element is formed by a flexible rubber band.

11. Flexible gap covering assembly according to claim 4, wherein the at least one tensioning element is formed by a flexible rubber band.

12. Flexible gap covering assembly according to claim 5, wherein the at least one tensioning element is formed by a flexible rubber band.

13. Flexible gap covering assembly according to claim 1, wherein the at least one tensioning element includes at least two tensioning elements, which, viewed in a transverse direction, are arranged at a distance from one another and are applied to the upper covering.

14. Flexible gap covering assembly according to claim 6, wherein the at least one holding arm is constructed in one piece with the bridge.

15. Flexible gap covering assembly according to claim 14, wherein each holding arm has a downward-projecting hook molded to its free end, into which hook an edge area of the tensioning element can be hung which is provided with an opening.

16. Flexible gap covering assembly according to one claim 1, wherein, when the steering column is swivelled up and has not moved out, the two parts of the upper covering are situated directly above one another in areas and are tensioned by the at least one tensioning element.

17. Flexible gap covering assembly according to claim 1, wherein, when the steering column is lowered or has moved out toward the driver, the two parts of the upper covering extend at an angle a with respect to one another, and wherein the two parts of the upper covering take up an approximately prolate tensioned position as a result of the at least one tensioning element.

18. Flexible gap covering assembly according to claim 16, wherein, when the steering column is lowered or has moved out toward the driver, the two parts of the upper covering extend at an angle α with respect to one another, and wherein the two parts of the upper covering take up an approximately prolate tensioned position as a result of the at least one tensioning element.

19. A flexible gap covering operable to cover a gap between a vehicle instrument panel and an adjustable steering column protruding into a vehicle occupant space from said instrument panel, said flexible gap covering comprising an upper covering portion which in use is disposed above a vehicle steering column, said upper covering portion being formed of two flexible parts arranged above one another and connected together in an overlapping joint area, and wherein at least one tensioning element is applied to the overlapping joint area to apply tension to thereby maintain a visually attractive low-wrinkle appearance of said flexible gap covering during adjusting movements of the steering column.

20. A flexible gap covering according to claim 19, wherein said at least one tensioning element includes a rubber band.

21. A method of making a flexible gap covering according to claim 19, said method comprising sewing the two flexible parts together along said overlapping joint area.

22. A method of making a flexible gap covering according to claim 19, said method comprising gluing the two flexible parts together along said overlapping joint area.

* * * * *